United States Patent [19]
Hudault et al.

[11] Patent Number: 4,802,656
[45] Date of Patent: Feb. 7, 1989

[54] ROTARY BLADE-TYPE APPARATUS FOR DISSOLVING ALLOY ELEMENTS AND DISPERSING GAS IN AN ALUMINUM BATH

[75] Inventors: Gérard Hudault, Pau; Pierre Netter, Voiron, both of France

[73] Assignee: Aluminium Pechiney, Paris, France

[21] Appl. No.: 97,880

[22] Filed: Sep. 17, 1987

[30] Foreign Application Priority Data

Sep. 22, 1986 [FR] France ............... 86 13362

[51] Int. Cl.$^4$ ............................................. C22B 21/06
[52] U.S. Cl. ................................. 266/225; 75/68 R; 266/235
[58] Field of Search ............... 266/225, 226, 235, 265; 75/68 R, 93 R; 161/87

[56] References Cited

U.S. PATENT DOCUMENTS

| | | | |
|---|---|---|---|
| 1,579,355 | 4/1926 | Greenawalt | 261/87 |
| 1,583,591 | 5/1926 | Greenawalt | 261/87 |
| 2,609,189 | 9/1952 | Dering | 261/87 |
| 3,227,547 | 1/1966 | Szekely | 266/235 |
| 4,283,357 | 8/1981 | Sidery | 261/87 |

Primary Examiner—Melvyn J. Andrews
Attorney, Agent, or Firm—Dennison, Meserole, Pollack & Scheiner

[57] ABSTRACT

The invention relates to an apparatus for dissolving alloy elements and dispersing gas in an aluminum bath comprising a vertical shaft (1) pierced along its axis by a duct (2) intended for passing the gas, connected in its upper part to a gas source and to a drive motor and comprising in its lower part which is immersed in the bath a disc (3) with the same axis as the shaft. It is characterized in that the disc is provided with blades (4) which extend along the generatrices of a right prism of parallelogrammatic section, have a rounded end, are inclined with respect to the horizontal at an angle of at most 45 degrees, have their faces between the two planes containing the upper and lower faces of the disc and are provided with axial orifices (7) connected to the duct (2) by a tubular passage (3). The apparatus permits the rapid production of alloys with a low proportion of alkaline elements therein, in particular in a transportation ladle.

9 Claims, 2 Drawing Sheets

ROTARY BLADE-TYPE APPARATUS FOR DISSOLVING ALLOY ELEMENTS AND DISPERSING GAS IN AN ALUMINUM BATH

The present invention relates to a rotary blade-type apparatus for dissolving alloy elements and dispersing gas in a bath of aluminium contained in a container.

The man skilled in the art is aware that objects which are produced with pure aluminium generally do not have the mechanical characteristics which are suited to many uses and that, in order to impart such characteristics to such articles, it is necessary in most cases to alloy the aluminium with other elements such as silicon, magnesium, iron, manganese, etc.

Such alloys are generally produced by incorporating those elements in solid form or in the form of solid particles into a bath of aluminium and dispersing them to the best possible degree by means of particular devices in such a way that they dissolve as quickly as possible.

Now at the present time in all industrial installations, such elements are introduced in the melting furnaces, which gives rise to the following disadvantages:

In certain parts of the furnace, it results in the formation of regions in which particles accumulate and agglomerate, with the dissolution thereof requiring a relatively long period of time;

It requires very heavy and very expensive stirring and mixing devices in the case of large-capacity furnaces; and it consumes a great deal of energy.

Furthermore, the only function of those devices is to disperse solids in a liquid.

Now, the man skilled in the foundry art is confronted not only with a problem in regard to the production of alloy but also the problem of eliminating certain impurities contained in the metal such as alkali and alkaline-earth metals which have harmful effects on the alloy produced, such as increasing the rate of oxidation of the molten metal or resulting in the components which are produced therefrom being fragile in the hot condition.

In order to remove such alkaline materials, recourse is generally had either to a treatment by means of a flow containing for example alkaline fluorides, or a treatment using a chlorinated gas. In the latter case, in order for the treatment to be effective, it is necessary to have sufficiently effective means for dispersing gas in a liquid metal.

It is true to say that in this case also the man skilled in the art has not remained inactive and he has developed gas dispersers which are suitable for that purpose. Mention may be made in particular of that described in French Pat. No. 2 512 067. However the latter are also specific to the function for which they were designed and they cannot generally be used as apparatuses for dissolving elements of alloys so that, in order to perform the two functions of dissolving more or less dense solids and dispersing gas in a liquid metal, the man skilled in the art is required to call on two types of apparatus and therefore two treatment stages, which accordingly increases the time required for carrying same into effect.

It is for that reason that the applicants sought to find a way of simultaneously carrying out the two functions, under attractive operating conditions.

That way is a rotary apparatus for dissolving alloy elements and dispersing gas in an aluminium bath coming in particular from direct tapping of an electrolysis tank contained in a container such as a transportation ladle, comprising a vertical shaft which is pierced along its axis by a duct intended for passing the gas, connected in its upper part to a gas source and to a drive motor and comprising in its lower part which is immersed in the bath a disc with the same axis as the shaft characterised in that the disc is provided on its side wall with blades which extend along the generatrices of a right-prism of parallelogrammatic section with the axis passing through the centre of the disc, the ends of which result from the intersection of said prism with a cylinder of the same axis as that which is on the side wall of the disc, the large faces of the prism forming an angle alpha of at most 45° to the horizontal and the small faces being disposed respectively in the planes of the upper and lower faces of the disc, said blades being provided with at least one orifice connected to the duct by a tubular passage.

Thus, in a conventional rotary apparatus which is supplied with gas by way of its hollow drive shaft, the invention consists of using a rotor formed by a disc, preferably of graphite, provided with blades, of a particular shape.

It is not easy to mix a liquid both with materials with a low density such as gases which have a tendency to rise rapidly and to escape to the atmosphere, and metals which in contrast fall rapidly to the bottom of the bath and agglomerate to form a mound which is found to be impossible to dissolve completely by virtue of practically zero liquid-solid exchanges.

However, it is indeed such a problem which the present applicants have resolved by developing a rotor with blades of particular profile and orientation, the rotor being mounted on a disc which by definition is of relatively small height in relation to its diameter. That profile is of a right prism with a section in the form of a parallelogram.

The above-mentioned orientation comprises positioning the blades in such a way that they are level with the upper and lower faces of the disc and setting them at an angle with respect to the horizontal which is relatively small, in contrast to certain designs in which the blades are at a much greater angle and therefore have a much greater bath-engaging area and consequently require a much larger amount of energy in order to move them.

Such a means makes it possible to achieve particular operating conditions which are propitious for the aim that the applicants seek to achieve, namely:

causing movement of the bath in a generalized fashion throughout the ladle, which makes it possible to increase the rate of dissolution of the alloy elements and to provide for improved diffusion of the gas to eliminate the alkaline materials;

abrupt variations in the speed of the fluid jets which cause relative displacement of the grains of metal in suspension with respect to the liquid;

the absence of surface turbulence or vortices which are the source of bath oxidation;

fine dissemination cf the gas bubbles which prevents them from rising back to the surface of the bath excessively quickly; and a relatively low speed of rotation which in any event is appropriate to prevent rotor wear.

Using such an apparatus provided with radial tubular passages of a diameter of between 2 and 5 mm, which are supplied with inert gas containing a few percent by volume of chlorine, under a pressure of between 0.1 and 0.3 MPa, rotating at a speed of between 100 and 350 revolutions per minute, a disc having a diameter corresponding to between one half and one third of the diameter of the container and disposed at a distance from the bottom of the container between one third and one quarter of the height of the bath, a high rate of dissolution of the alloy elements which are usually employed in aluminium metallurgy and good removal of the alkaline elements such as sodium and lithium were achieved.

However it is possible to arrive at an optimum situation in respect of the results when preferably certain additional characteristics are used in the design of the disc. They are as follows:

the number of blades is between 4 and 8, the length of the axis of each blade is close to the radius of the disc, the thickness e of each blade is between one quarter and three quarters of the height of the disc, the width of each blade is between one fifth and four fifths of the diameter of the disc, an angle $\alpha$ is between 10 and 20 degrees, a direction of rotation of the disc such that in that direction the large underneath faces of the blades are upstream of the top faces, the orifices for introducing gas into the bath are disposed at the ends of the axes of the blades, and the ratio of the diameter to the height of the disc is between 12 and 5.

The invention will be better appreciated by reference to the accompanying drawings in which:

BRIEF DESCRIPTION OF THE DRAWINGS

Referring to FIGS. 1 and 3, shown therein is a disc 3 which rotates in the direction 9 and which is provided with blades 4 which have a large face 5 and a small face 6. Disposed at the ends of the axes thereof are orifices 7 communicating with the duct 2 by way of tubular passages 8.

FIG. 2 shows the shaft 1 which is pierced by a duct 2 and comprising in its lower part a disc 3 of a height h, provided with blades 4 of a thickness e and forming an angle $\alpha$ to the horizontal and of parallelogrammatic section formed by the large faces 5 and the small faces 6 best seen in FIG. 3 which are flush with the upper and lower surfaces of the disc. The gas supply orifice 7 is disposed at the end of the axis of one of the blades.

Figure 1:
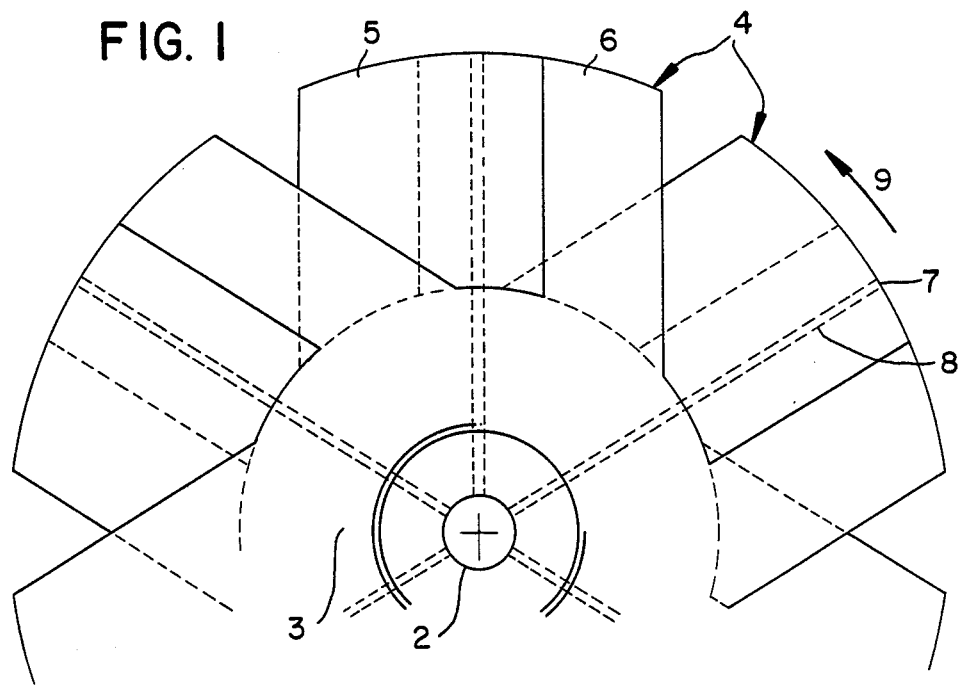
FIG. 1 is a fragmentary plan view of the rotor of the invention.
Figure 2:
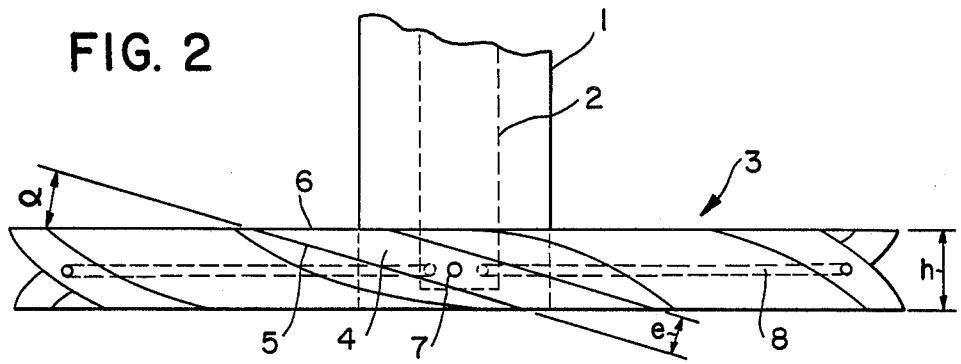
FIG. 2 is a side elevation of the rotor of the invention.
Figure 3:
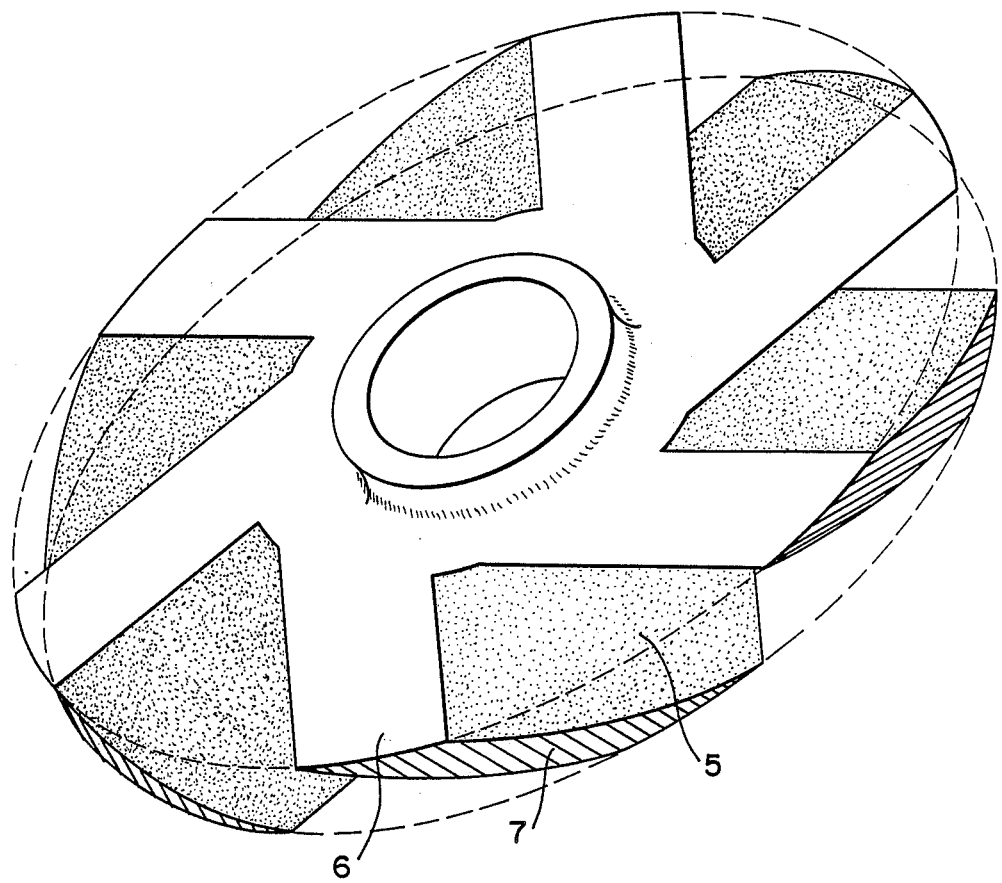
FIG. 3 is a perspective view of the rotor of the invention.

In operation, the disc which is immersed in the aluminium bath is driven by a motor (not shown) in the direction indicated by the arrow and gas is introduced by way of a source (not shown) into the duct 2 while the alloy elements escape from a hopper which is disposed above the bath in the vicinity of the shaft. Under the combined action of the mixing and stirring effect imparted by the particular profile and orientation of the blades and the action of the gas which is distributed by way of the ends of the blades, that results in rapid dissolution of the alloy elements and the elimination of alkaline impurities.

The invention can be illustrated by reference to the following examples of use thereof:

A number of tests involving simultaneous dissolution of alloy elements and elimination of alkaline materials in baths of aluminium coming from electrolysis tanks and contained in ladles were carried out.

The general conditions were as follows:

substantially cylindrical ladle of the following dimensions: height 1.60 m and diameter 1.70 m height of the bath in the ladle of between 1.05 m and 1.30 m apparatus according to the invention disposed on the axis of the ladle with a disc of a diameter of 0.70 m and a height of 0.06 m and provided with 6 blades inclined at an angle of 16 degrees, and feed of alloy elements by means of a hopper disposed above the bath at 0.40 m from the shaft. The particular conditions of the test and the results obtained are set forth in the following Table:

| | Al BATH | | APPARATUS | DISSOLUTION | | | | | |
|---|---|---|---|---|---|---|---|---|---|
| | Temperature in °C. | Weight in | Rotary speed | Height of the disc above the bottom | WEIGHT OF ALLOY ELEMENTS ADDED IN KG | | | | PERIOD OF DISSOLUTION |
| TEST | Begin. End | Kg | in rpm | of the ladle in m | Fe/Si | AC 90* | Mg | Mn | Cu | IN MINUTES |
| 1 | 825  759 | 5860 | 195 | 500 | | 40 | 160 | 10 | | 6 |
| 2 | 830  770 | 5560 | 215 | " | | | | 180 | 33 | 9 |
| 3 | 842  806 | 4780 | 230 | 550 | 17 | | 52 | 56 | 5 | 7 |
| 4 | 824  758 | 5840 | 220 | 450 | | | 224 | 72 | | 6 |

*AC 90 chromium mother alloy containing 90% by weight of chromium.
It should be noted that all the elements were added in the form of powder of a granulometry of between 0.25 and 3 mm except for the magnesium in the form of ingots weighing 7 kg and copper in the form of swarf.

| ELIMINATION OF ALKALINE MATERIALS | | | | | | |
|---|---|---|---|---|---|---|
| GAS FLOW RATES USED IN N l/h | | INITIAL CONTENT in ppm | | FINAL CONTENT in ppm | | DURATION IN |
| TEST | Ar | Cl2 | Na | Li | Na | Li | minutes |
| 1 | 10000 | 900 | 38 | 22 | 2 | 3 | 10 |
| 2 | 10000 | 200 | 25 | 22 | 1.5 | 2 | 10 |
| 3 | 10000 | 600 | 18 | 8 | 0.5 | 0.5 | 10 |
| 4 | 8000 | 900 | 30 | 7 | 1.5 | 1 | 10 |

It is found that virtually total dissolution of most of the conventional additive elements of aluminium is achieved in less than 10 minutes and at the same time the content of Na and Li can be lowered in less than 10 minutes to around 3 ppm.

The invention finds application in particular in the rapid production of aluminium alloys with a low content of alkaline materials.

We claim:

1. A rotary blade-type apparatus for dissolving alloy elements and dispersing gas in an aluminium bath comprising a vertical shaft (1) which is pierced along its axis by a duct (2) intended for the passage of the gas, connected in its upper part to a source of gas and to a drive motor and comprising in its lower part which is immersed in the bath a disc (3) with the same axis as the shaft characterised in that the disc is provided on its side wall with blades (4) which extend along the generatrices of a right prism of parallelogrammatic section with its axis passing through the centre of the disc, the ends of which result from the intersection of said prism with a cylinder of the same axis as that bearing against the side wall of the disc, the large faces (5) of the prism forming an angle $\alpha$ of at most 45 degrees to the horizontal and the small faces (6) being disposed respectively in the planes of the upper and lower faces of the disc, said blades being provided with at least one orifice (7) connected to the duct (2) by a tubular passage (8).

2. Apparatus according to claim 1 characterised in that the number of blades is between 4 and 8.

3. Apparatus according to claim 1 characterised in that each blade has an axis of a length which is close to the radius of the disc.

4. Apparatus according to claim 1 characterised in that each blade is of a thickness e of between one quarter and three quarters of the height of the disc.

5. Apparatus according to claim 1 characterised in that each blade is of a width of between one fifth and four fifths of the diameter of the disc.

6. Apparatus according to claim 1 characterised in that $\alpha$ is between 10 and 20 degrees.

7. Apparatus according to claim 1 characterised in that if the direction (9) of rotation of the disc is followed, the large underneath faces of the blades are disposed upstream of the top faces.

8. Apparatus according to claim 1 characterised in that the orifices (7) are disposed at the ends of the axes of the blades.

9. Apparatus according to claim 1 characterised in that the ratio of diameter to height of the disc is between 12 and 5.

* * * * *